United States Patent
Spohn

[11] Patent Number: 6,127,478
[45] Date of Patent: Oct. 3, 2000

[54] BLENDS OF GRAFTED FLUOROPOLYMER AND POLYAMIDE

[75] Inventor: Peter Dwight Spohn, Wilmington, Del.

[73] Assignee: E. I. du Pont de Nemours and Company, Wilmington, Del.

[21] Appl. No.: 09/235,422

[22] Filed: Jan. 22, 1999

Related U.S. Application Data

[63] Continuation-in-part of application No. 09/106,709, Jun. 29, 1998.
[60] Provisional application No. 60/053,751, Jul. 25, 1997, abandoned.

[51] Int. Cl.[7] .................................................. C08G 63/48
[52] U.S. Cl. .............................................. 525/66; 525/902
[58] Field of Search ....................................... 525/66, 902

[56] References Cited

U.S. PATENT DOCUMENTS

| | | | |
|---|---|---|---|
| 5,132,368 | 7/1992 | Chapman, Jr. et al. | 525/165 |
| 5,576,106 | 11/1996 | Kerbow et al. | 428/403 |
| 5,599,871 | 2/1997 | Bong-Hyun Park | 524/504 |

FOREIGN PATENT DOCUMENTS

| | | |
|---|---|---|
| 0 626 424 A1 | 11/1994 | European Pat. Off. . |
| 0 761 757 A1 | 3/1997 | European Pat. Off. . |

*Primary Examiner*—Ana Woodward
*Attorney, Agent, or Firm*—Thomas W. Steinberg

[57] ABSTRACT

A melt-mixed blend of polyamide and grafted fluoropolymer having polar functionality exhibits surprisingly low permeability and can bond to fluoropolymer or polyamide without an intervening adhesive layer. The blend is useful as a component of laminates, such as fuel hose.

6 Claims, No Drawings

BLENDS OF GRAFTED FLUOROPOLYMER AND POLYAMIDE

RELATED APPLICATION

This application is a continuation-in-part of application Ser. No. 09/106,709 filed Jun. 29, 1998, now abandoned, which in turn claims the benefit of Provisional Application Ser. No. 60/053,751 filed Jul. 25, 1997, now abandoned.

FIELD OF THE INVENTION

This invention relates to blends of fluoropolymer with polyamide.

BACKGROUND OF THE INVENTION

U.S. Pat. No. 5,576,106 (Kerbow et al.) discloses a process for grafting an ethylenically unsaturated compound onto the surface of the particles of fluoropolymer powder. The ethylenically unsaturated compound provides polar functionality to the fluoropolymer, which is otherwise non-polar. The utility of the resultant grafted fluoropolymer powder is disclosed to be to act as an adhesive to adhere dissimilar materials together, such as tetrafluoroethylene/ethylene (ETFE) copolymer to polyamide. To demonstrate the interaction between the grafted powder and the polyamide, a blend of grafted powder and polyamide is made by simple mixing of these components in a weight ratio of 67:33 (55:45 by volume), and the resultant blend is compression molded to yield plaques which exhibit improved tensile elongation.

European Patent Application Publication EP 0 761 757 discloses a fluorine-containing polymer alloy of a grafted fluorine-containing polymer and a polymer containing no fluorine, the fluorine-containing polymer having hydrogen atoms bonded to carbon atoms of its main chain. The grafting is done by melt mixing a fluorine-containing polymer having hydrogen atoms bonded to main-chain carbon atoms, a grafting compound having a linking group and a functional group, and a radical-forming agent (peroxide), apparently either simultaneously with or prior to mixing with the polymer containing no fluorine to form the alloy. No amount of grafting compound actually grafted to the fluorine-containing polymer is disclosed, and the average particle size of the dispersed fluoropolymer is relatively large, i.e., 0.7 μm (700 nm) and larger. In attempts to evaluate this grafting technology, the maximum amount of maleic anhydride that could actually be grafted to ETFE fluoropolymer was no more than 0.2 wt %. The color of the product indicated residual decomposition products from the grafting chemistry, and no bond of such grafted fluorine-containing polymer to 6,6-polyamide was obtained in coextrusion.

There remain needs for fuel hose of simple construction, for shaped articles for handling and containing fuel fluids, and for materials for use in fabricating such hose and articles.

SUMMARY OF THE INVENTION

It has now been discovered that polar-grafted fluoropolymer can be melt blended with polyamide to produce a dispersion of the fluoropolymer in a matrix of the polyamide, so as to provide enhanced utility such as in composite hose which is useful for conveying fuel in motorized vehicles, or in containers for handling fuel or fuel vapors. This invention, then, provides a melt-mixed blend, comprising polyamide as the matrix of the blend and fluoropolymer having polar functionality dispersed therein with average dispersed particle size of no more than 500 nm, said polar functionality being present as part of an ethylenically unsaturated compound grafted to said fluoropolymer. The blends of the present invention also exhibit surprisingly low permeability and improved chemical resistance relative to polyamide. Consequently, the melt-mixed blend has utility as a barrier to chemicals such as fuels having high vapor pressure, and thus in articles for transport and containment of such chemicals.

The melt-mixed blend is useful in structures made from the blend alone, and in composite structures with fluoropolymer and/or polyamide. In such composites, a separate adhesive layer is no longer necessary to adhere the components together.

DETAILED DESCRIPTION

Any polyamide can be used to constitute the polyamide component of the melt-mixed blend of the invention. Such polyamide should of course be melt extrudable, and preferably has a number average molecular weight of at least 5000. Examples of polyamides include those made by condensation of equimolar amounts of at least one saturated dicarboxylic acid containing 4 to 14 carbon atoms with at least one diamine containing 4 to 14 carbon atoms. Excess diamine, however can be used to provide an excess of amine end groups over carboxyl end groups in the polyamide. Specific examples include polyhexamethylene adipamide (66 nylon), polyhexamethylene azelaamide (69 nylon), polyhexamethylene sebacamide (610 nylon), polyhexamethylene dodecanoamide (612 nylon) and polycaprolactam (6 nylon). Aromatic polyamides that are melt extrudable (e.g., aliphatic-aromatic polyamides, as opposed to polyaramids) can also be used in the melt-mixed blends of the present invention. Examples of such semiaromatic polyamides include Amodel® A 1000 and copolymers of 2-methylpentamethylenediamineterephthalate and hexamethyleneterephthalamide such as Zytel® HTN 501 (DuPont). Elastomer-modified versions of such aliphatic and aromatic polyamides can also be used, e.g., Amodel® ET 1000 HSNT (Amoco). Polyamides are polar polymers that are well-known in the art. See, for example, Kirk-Othmer, Encyclopedia of Chemical Technology, 4th ed., Vol. 19, p. 454 (1996).

The polyamide is present as the matrix of the melt-mixed blend of the present invention. That is, the polyamide component forms the continuous phase of the melt-mixed blend.

With respect to the fluoropolymer constituting the fluoropolymer component of the melt-mixed blend of the present invention, a wide variety of fluoropolymers can be used which are melt extrudable, such as indicated by a melt viscosity in the range of $0.5 \times 10^3$ to $60 \times 10^3$ Pa·s as normally measured for the particular fluoropolymer. The fluoropolymer is made from at least one fluorine-containing monomer, but may incorporate monomer which contains no fluorine or other halogen. Preferably at least one monomer contains hydrogen and in that regard the hydrogen/fluorine atomic ratio is preferably at least 0.1:1. The fluoropolymer, however, preferably contains at least 35 wt % fluorine. Fluorinated monomers include those which are fluoroolefins containing 2 to 8 carbon atoms and fluorinated vinyl ether (FVE) of the formula $CY_2=CYOR$ or $CY_2=CYOR'OR$ wherein Y is H or F and —R— and —R'— are independently completely fluorinated or partially fluorinated linear or branched alkyl and alkylene groups containing 1 to 8 carbon atoms. Preferred R groups contain 1 to 4 carbon atoms and are preferably perfluorinated. Preferred R' groups contain 2 to 4 carbon atoms and are preferably perfluorinated. Hydrocarbon monomers that can be used include ethylene, propylene, n-butylene, and iso-butylene. Preferred fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve properties such as reduced high temperature brittleness. Perfluoro(propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly hexafluoropropylene (HFP) and optionally TFE. TFE/HFP copolymer which contains a small amount of $VF_2$, which copolymer is often referred to as THV, can also be used. Examples of perfluorinated copolymers include TFE with HFP and/or PPVE or perfluoro(ethyl vinyl ether). Such fluoropolymers are usually partially-crystalline as indicated by a non-zero heat of fusion associated with a melting endotherm as measured by DSC on first melting, and are considered to be fluoroplastics rather than fluoroelastomers.

The fluoropolymer is functionalized by having an ethylenically unsaturated compound grafted thereto which imparts polar functionality to the fluoropolymer, the polar functionality being present as part of the ethylenically unsaturated compound. More particularly, the polar-grafted fluoropolymer used in the melt-mixed blend of the present invention preferably is in the form of, i.e., is produced as, powder having the grafting compound grafted to the surface of the powder particles. Thus, the polar-grafted fluoropolymer is, also, surface-grafted fluoropolymer powder, or surface-grafted fluoropolymer. Such surface-grafted fluoropolymer powder is disclosed, for example, in U.S. Pat. No. 5,576,106. Such surface-grafted powder has good color, i.e., is not discolored, indicating that it is free from residues of the sort that accompany extrusion grafting. Examples of polar functionality provided by grafting include acids, including carboxylic, sulfonic and phosphonic acids, and esters and salts thereof, and epoxides.

Glycidyl methacrylate is an example of a grafting compound that provides epoxide functionality. Among compounds for grafting onto and thereby becoming part of the polar-grafted fluoropolymer, maleic acid and maleic anhydride are preferred. The amount of grafting compound grafted to the fluoropolymer will be in an amount that is effective to cause development, in melt mixing of the blend, of the small dispersed particle size of the polar-grafted fluoropolymer as stated below. Generally, the amount of grafted compound is in the range of 0.1 wt % to 5 wt % based on the total weight of the resultant polar-grafted fluoropolymer. Preferably, the amount of grafted polar-functional compound is 0.2–3 wt %, more preferably 0.3–2 wt %. The surface-grafted fluoropolymer is prepared prior to melt blending with the polyamide.

The polar-grafted fluoropolymer forms a dispersed phase of the melt-mixed blend of the present invention. The melt mixing causes the polar-grafted fluoropolymer to be present as small particles, generally well-dispersed (uniformly dispersed) in the polyamide matrix. The particles of polar-grafted fluoropolymer are generally spherical in shape, e.g., predominantly having a ratio of major/minor dimensions of 2/1 or less. The dispersed particles of polar-grafted fluoropolymer are small, having average dimensions of no more than 500 nm, preferably no more than 350 nm.

The exceptionally small dispersed particle size of the polar-grafted fluoropolymer results in the melt-mixed blend of the invention having good mechanical properties and surprisingly low permeability to chemicals such as hydrocarbon and hydrocarbon-based fuels having high vapor pressure. These properties make the blend suitable for use as a barrier to such chemicals, for example, in articles for transport and containment of such chemicals, such as articles that are components of automotive fuel systems. Since the blend also adheres to fluoropolymer and/or to polyamide, depending on blend proportions and laminating conditions, such articles can be composites having good integrity with fluoropolymer or polyamide adhered to the melt-mixed blend of the invention, e.g., composite fuel line or hose.

The melt-mixed blend of the present invention is preferably prepared by melt blending the ingredients together under high shear. The ingredients can first be combined in desired proportions and blended with each other in the dry state, such as by tumbling in a drum, or can be combined by simultaneous or separate metering of the feed of one or more of the components to the melt blending device. Preferably, the melt blending is done in a twin screw extruder, such as manufactured by Werner & Pfleiderer or by Berstorff. Numerous other high shear melt blending devices, as known to those skilled in the art, can be used without departing from the spirit of the invention.

For blends of the present invention, the polar-grafted fluoropolymer used in the blend can impart fluoropolymer characteristics, previously lacking in polyamide, to the blend without destroying the capability of the blend to adhere to neat polyamide. Such characteristics can include a reduction in permeation by fuels (improved impermeability), better resistance to chemical attack, altered surface properties, and the like. When the melt-mixed blend is to be used in combination with fluoropolymer, as in a laminate, the amount of polar-grafted fluoropolymer in the blend is preferably any amount that is effective to cause the blend to adhere to a fluoropolymer layer. Such amount will vary with the identity of the fluoropolymer of the fluoropolymer layer and the amount of polar functional compound grafted to the fluoropolymer component of the blend.

The melt-mixed blend of the present invention can adhere to a coextruded layer of another polymer which may be fluoropolymer or polyamide. As will be recognized by one skilled in the art, such adhesion can depend on laminating conditions as well as on compositions of the layers. Such conditions can include temperature, extrusion speed, draw down ratio, draw ratio balance, interfacial pressure, cooling rate, cooling conditions (such as maintenance of pressure during cooling), and the like, and can be influenced by equipment choices such as mandrel length, die design features including land length, and the like. By "adhere to a coextruded layer of another polymer" is meant that, when a laminate comprising another polymer and melt-mixed blend layers is formed in a single extrusion step, i.e., by coextrusion, the melt-mixed blend layer and the other layer adhere to one another without the presence of an adhesive tie layer. The adhesion can be characterized, for example, when the coextrusion is in the form of tubing and the melt-mixed blend of the invention forms one of the layers. When the tubing is longitudinally cut in half, the cut composite tubing half can be flexed and even bent at a 90° angle without the melt-mixed blend layer delaminating from the other layer.

The amount of polar-grafted fluoropolymer in the blend is generally 3–43 vol %, preferably 6–29 vol %, most preferably 10–21 vol %, based on combined weight of polyamide and polar-grafted fluoropolymer. For polar-grafted fluoropolymer that is a grafted copolymer of ethylene, tetrafluoroethylene, and perfluorobutyl ethylene as described in the examples below, the aforesaid concentrations in vol % correspond to 5–55 wt %, 10–40 wt %, and 15–30 wt %, respectively, calculated using 1.70 g/cm$^3$ and 1.04 g/cm$^3$ as densities of the fluoropolymer and the polyamide, respectively. For functionalized perfluoropolymer, concentrations by weight corresponding to the aforesaid volume concentrations would be higher according to the higher density of perfluorinated resins, typically about 2.15 g/cm$^3$.

One skilled in the art will recognize that the polar-grafted fluoropolymer component of the melt-mixed blend of the present invention can, itself, be a blend. Thus, for example, the polar-grafted fluoropolymer component can be a blend of two or more polar-grafted fluoropolymers, or a blend of at least one polar-grafted fluoropolymer and at least one fluoropolymer that has not been grafted with a compound having polar functionality. Such blends are considered to be polar-grafted fluoropolymer for purposes of calculating concentration of polar-grafted fluoropolymer, e.g., 3–43 vol %, in the melt-mixed blend of the invention, and for purposes of calculating concentration of grafted polar-functional compound, e.g., 0. 1–5 wt %, in polar-grafted fluoropolymer in the melt-mixed blend of the invention.

Fluoropolymers, polar-grafted fluoropolymers, and/or polyamides useful for the melt-mixed blend of the invention include resins recovered from scrap or previously fabricated articles, including resin blends or mixtures.

The blends of the present invention exhibit surprising properties relative to those of the polyamide component of the blends. As shown by Example 3 below, for example, the blends exhibit much lower permeability to a fuel mixture than would be expected on the basis of the amount of fluoropolymer in the blends. The blends also exhibit better resistance to chemical attack than the polyamide alone. Thus, the blends of the invention are suitable for use in articles for containing and handling of fuels, such as hose, tubing, canisters, and the like.

Additionally, it has been found that polar-grafted fluoropolymer as described below can be used to adhesively activate the polyamide, as well as to enhance properties of the polyamide. That is, when polar-grafted fluoropolymer is incorporated into polyamide to form a blend of the present invention, the resultant blend can be directly adhered to non-functional fluoropolymer by melt processes to form a laminate. Such non-functional fluoropolymer has the same general composition as the fluoropolymer that is polar-grafted, or is compatible (miscible) with the fluoropolymer that is polar-grafted. By "directly adhered" is meant that there is no intervening tie layer present. It is the adhesive activation of the polyamide of the polymers forming the layers that causes the adhesion of the layers, one to the other, thereby providing integrity to the laminate without the use of a tie layer. The combination of reduced permeability and adhesive activation suggests utility of the blends, for example, in tubular laminates with fluoropolymer for use as fuel hose. See Example 5 below.

EXAMPLES

The polar-grafted fluoropolymer of the examples below is prepared generally according to Example 1 of U.S. Pat. No. 5,576,106. The fluoropolymer resin is an ETFE copolymer modified with PFBE, having an E/TFE molar ratio of about 0.9, containing 1 mol % PFBE, and having a melt flow rate (MFR) of about 7 g/10 min as measured according to ASTM D-3159 at 297° C. The copolymer is used as a finely divided powder having average particle size of about 100–120 μm (within the preferred range of 50–500 μm), as described in the '106 patent. Copolymer powder and maleic anhydride are blended in a powder/anhydride ratio of 100/1 and subjected to 6 Mrad of electron irradiation in a closed container to obtain surface-grafted powder. The resultant concentration of grafted maleic anhydride is about 0.4 wt %, as determined by the method disclosed in U.S. Pat. No. 5,576,106. The grafted ETFE powder is compacted at ambient temperature into pellets to facilitate feeding to an extruder. This polar-grafted fluoropolymer is identified as "g-ETFE".

Unless otherwise specified, the polyamide used is a 6,6-polyamide (Zytel® nylon resin grade 101, DuPont), hereinafter "nylon".

Proportions of g-ETFE and nylon in the following are based on combined weight or on combined volume of g-ETFE and nylon.

Example 1

Blend 1 is 20 wt % (13.3 vol %) g-ETFE. The melt blending device is a 40-mm Werner & Pfleiderer twin screw extruder equipped with high-shear two-zone mixing screws operating at 400 rpm. The g-ETFE (40 lb/hr, 18.2 kg/hr) and nylon (160 lb/hr, 72.7 kg/hr) are fed into barrel section 1 by separate K-Tron loss-in-weight screw feeders. A vacuum is applied at barrel section 8. External barrel temperatures are 273°–285° C., and product melt temperature is 389° C. as determined using a hand-held thermocouple temperature probe. After exiting through a 4-hole die, the strands are quenched in an ambient temperature water trough with circulating water. The strands are subsequently pelletized and allowed to cool under nitrogen sparge. A film hot-pressed from the Blend 1 pellets is treated with phosphotungstic acid that stains only the nylon, and transmission electron micrographs (TEM) are recorded. The blend shows good mixing, with predominantly spherical g-ETFE particles having average diameter of about 200 nm evident on the surface and well dispersed in the nylon.

When ETFE that is not polar-grafted is used to make an ETFE/nylon blend that is 20 wt % ETFE, a stained film sample shows large spheres of ETFE about 5000–10,000 nm (5–10 μm) in diameter.

Example 2

Blend 2 is 50 wt % (38.0 vol %) g-ETFE. Blend 2 is prepared essentially by the procedure of Example 1, except that the feed rates of the g-ETFE and the nylon are each 100 lb/hr (45.5 kg/hr), the external barrel temperature is 264°–280° C., and the product melt temperature is 340° C. TEM for a stained film sample again shows good mixing, with spherical g-ETFE particles having average diameter of about 200 nm well dispersed in the nylon.

Example 3

Films 0.010 inch (0.25 mm) thick are hot pressed from Blend 1 and Blend 2, and from g-ETFE and nylon as controls. Portions of these films are then mounted in modified Thwing-Albert permeation cups according to ASTM E96-66. Each test cup is loaded with 100 mL (~76 g) of Fuel CM15 (15% of methanol in Fuel C, which is 50/50 isooctane/toluene), and a 76.2-mm-diameter diaphragm of the test film is placed on top of the cup. The diaphragm is held in place using a six-bolt flange sealing ring with a fluoroelastomer sealing gasket. The exposed surface area of the diaphragm is 37 cm². The cup is weighed after assembly, inverted so that the fuel is in contact with the test diaphragm, and then weighed at various intervals over a 31 day period. Testing is conducted at room temperature, and samples are tested in duplicate. Rates of weight loss are presented in Table 1, which shows the average for each pair of tests, and also as normalized relative to nylon. The rate of weight loss for g-ETFE is not measurable in this test. Even though g-ETFE is only 13.3 vol % of Blend 1, the permeation rate for Blend 1 is 87% lower than that for pure nylon. Likewise, the permeation rate for Blend 2 is 96% lower than that for nylon, even though g-ETFE is only 38 vol % of the blend. These results are surprising in that one would expect the permeation rate relative to pure nylon to be reduced in proportion to the g-ETFE fraction in the melt-mixed blend.

TABLE 1

Permeation Testing

| Diaphragm | Average Rate of Weight Loss | |
|---|---|---|
| | Loss (g/day) | Normalized (%) |
| Nylon | 0.1700 | 100 |
| Blend 1 | 0.0226 | 13 |
| Blend 2 | 0.0065 | 4 |
| g-ETFE | — | ~0 |

Example 4

The MFR of Blend 1 is 91 g/10 min as measured according to ASTM D-3159 as for ETFE resins. See above. This indicates that the blend is useful for the injection molding of complex shapes and parts having thin sections. Blend 1 is used to injection mold a cup-like canister in an 8-oz (237 mL) Cincinnati Milacron injection molding machine. Melt temperature is 569° F. (298° C.), overall cycle time is 28 sec, and part weight is 21.5 g. The part is of good quality, demonstrating the fabrication of articles by injection molding the melt-mixed blend of the invention.

Example 5

Sheets approximately 6 inch (15 cm) square and 0.030 inch (0.76 mm) thick are molded from Blend 1, and from an ETFE resin that is not functionalized by polar grafting (Tefzel® ETFE fluoropolymer resin grade 200), by hot pressing. The sheets are placed together within the 6-inch square opening in a 0.050-inch (1.3-mm) thick chase and between two metal plates. This sandwich is placed in a laboratory press having heated platens at 300° C., and the sandwich is heated for 5 min without applied pressure. The pressure on the sandwich is increased to 56 psi (0.39 Mpa) for 5 min. Then, the pressure is released, the platens are allowed to cool, and the sample is examined. The two sheets are in intimate contact and cannot be separated with fingernails or even with a knife. By visual examination of the interface, it appears that Blend 1 and the fluoropolymer have merged (blended) at the interface. When a sheet of nylon is substituted for the Blend 1 sheet and the laminating procedure is repeated, there is no interaction between the nylon and the ETFE, i.e., no adhesive bond is formed. The adhesive bond between Blend 1 and the ETFE indicates the adhesive activation of the nylon by the g-ETFE.

This bonding is also accomplished by coextrusion using the following process. Blend 1 and ETFE 200 are coextruded as a two layer composite having the fluoropolymer as the inner layer and Blend 1 as the outer layer. The ETFE resin is extruded using a 1.0 inch (2.54 cm) Davis extruder equipped with a mixing screw and at a melt temperature of 575° F. (302° C.). The melt-mixed blend is extruded using a 1.5-inch (38-mm) Davis extruder equipped with a general purpose screw at a melt temperature of 530° F. (277° C.). The die has a land length of 3.5 inch (8.9 cm) and the extrusion is carried out in a pressure extrusion mode at the rate of 10 ft/min (3.05 m/min). The crosshead die temperature is 550° F. (288° C.). The coextruded tubing is 0.270 inch (6.9 mm) in outside diameter and has a wall thickness of 0.030 inch (0.76 mm) of which the ETFE resin inner layer is 0.005 inch (0.13 mm) thick. Adhesion between the layers is demonstrated by cutting lengths of the tubing longitudinally in half, and flexing and bending a resultant half of the tubing. The layers do not separate, demonstrating the adhesion of the melt-mixed blend of the invention to the fluoropolymer. Such composite tubing can be used for fuel transport tubing.

Polyamide can also be coextruded along with the above components in a multi-layer system having the melt-mixed blend as the middle layer, using the polyamide extrusion conditions described in Example 6.

Example 6

Blend 1 and a polyamide resin (Zytel® nylon grade ST811, DuPont) are coextruded as a two-layer composite tubing having Blend 1 as the inner layer and the polyamide as the outer layer. The melt-mixed blend is extruded using a 1.0-in (2.54-cm) Davis extruder equipped with a general purpose extrusion screw and at a melt temperature of 530° F. (277° C.) entering the coextrusion crosshead to form the inner layer of coextruded tubing. The polyamide is extruded using a 1.5-inch (3.81-cm) Davis extruder equipped with a general purpose screw and at a melt temperature of 451° F. (233° C.) entering the coextrusion crosshead to form the outer layer of the coextruded tubing. The crosshead die temperature is 550° F. (288° C.) and the extrusion rate is 8.5 ft/min (259 cm/min). The coextruded tubing is 0.270 inch (6.86 mm) in outer diameter and has a wall thickness of 0.030 inch (0.76 mm) of which the melt-mixed blend inner layer is 0.005 inch (0.13 mm) thick. Adhesion between the inner and outer layers of the coextruded tubing is demonstrated by cutting lengths of the tubing longitudinally in half and flexing and bending a resultant half of the tubing. The layers do not separate, demonstrating the adhesion of the melt-mixed blend of the invention to polyamide. Such composite tubing can be used for fuel transport tubing.

Example 7

Two pellets each of nylon, Blend 1, and Blend 2 are placed in 95% formic acid at room temperature in separate test tubes. After 5 min, the nylon pellets are soft and stick to the wall of the tube. Blend 1 pellets are also soft. However, the Blend 2 pellets are still hard after 5 min and do not stick to the test tube.

Three pellets each of nylon and Blend 1 are placed in separate test tubes with 5 g of phenol, and the tubes are placed in a 50° C. water bath. After 90 min, the nylon is completely dissolved. The Blend 1 pellets are partially dissolved, but hard pieces of resin remain. The remaining resin is more than can be accounted for by the 12.8 vol % of g-ETFE in Blend 1, indicating that part of the blend remains.

These results show that the melt-mixed blends of the present invention have better chemical resistance than the polyamide matrix of the blends.

Example 8

Blend 3 is similar to Blend 2 (Example 2) except that half of the g-ETFE is replaced by a similar ETFE resin that is not grafted, and is prepared by melt mixing with two passes through a 25-mm Brabender parallel twin screw extruder operating at 180 rpm and at a melt temperature of 340° C. MFR is 10.5 g/10 min.

Example 9

The coextrusion procedure of Example 6 is essentially repeated, except that Blend 3 is used for the inner layer of the composite tube the melt temperature of Blend 3 entering the crosshead is 600° F. (316° C.), the polyamide melt temperature entering the crosshead is 450° F. (232° C.), the crosshead die temperature is 610° F. (321° C.), and the extrusion rate is 11 ft/min (335 cm/min). The coextruded tubing is 0.240 in (6.10 mm) in outer diameter and has a wall thickness of 0.032 inch (0.81 mm) of which the melt-mixed blend inner layer is 0.003 inch (0.08 mm) thick. Adhesion between the middle and outer layers of the coextruded tubing is demonstrated by cutting lengths of the tubing longitudinally in half and flexing and bending a resultant half of the tubing. The layers do not separate despite the high concentration of fluoropolymer in the melt-mixed blend.

Example 10

The coextrusion procedure of Example 6 is essentially repeated, except that a different polyamide (Zytel® nylon grade 42, DuPont) is used for the outer layer of the composite tube, the melt-mixed blend is extruded using a 1.0-inch (2.54-cm) Entwistle extruder equipped with a mixing screw, the Davis-Standard extruder is equipped with a mixing screw, the melt temperature of the polyamide entering the coextrusion crosshead is 550° F. (288° C.), the crosshead die temperature is 570° F. (299° C.), and the extrusion rate is 10 ft/min (305 em/min). The coextruded tubing dimensions are the same as in Example 9. Adhesion between the layers of the coextruded tubing is demonstrated by cutting lengths of the tubing longitudinally in half and flexing and bending a resultant half of the tubing. The layers do not separate.

Example 11

Composite tubing 0.3 inch (7.6 mm) in outside diameter with a 0.030 inch (0.76 mm) thick wall, having a polyvinylidene fluoride (PVDF, Hüls) inner layer and a polyamide 12 (Hüls) outer layer is fabricated so that, by weight, the tubing is 70% polyamide and 30% PVDF. The tubing is cut up using a Plastic Grinder (Molders Service Co.) to form a coarse shredded mixture of the two polymer resins. A sample of the shred is dry-blended with g-ETFE in the proportions 70% shred and 30% g-ETFE by weight, so that that the blend is 58% polyamide by volume. The shred/g-ETFE blend is then melt-mixed by one pass through a 25-mm Brabender parallel twin screw extruder, operating at 130 rpm and at an external barrel temperature of 300° C., and equipped with a single-strand die. The extrudate is drawn through a water trough and cut into pellets. The shred without g-ETFE is converted into pellets in the same manner. Pellets are dried for at least 2 hr at 190° F. (88° C.) before injection molding into tensile bars and impact bars using a 1752 kN, 6.7 oz (198 mL) Nissei FN4000 injection molding machine having a barrel temperature of 255°–275° C. TEM samples are sectioned from the bars using a cryoultramicrotome equipped with diamond knives cutting perpendicular to the direction of resin flow during injection molding. Average dimensions of fluoropolymer particles dispersed in the polyamide are given in Table 2. For the blend containing g-ETFE, the dispersed particles are predominantly spherical and show no separation of the fluoropolymer from the polyamide matrix. For the blend without g-ETFE, the dispersed fluoropolymer particles are long and stringy, and show significant separation from the polyamide. Tensile properties (ASTM D-638) and impact strength (notched Izod, ASTM D-256) at room temperature are also given in Table 2. Tensile elongation at break and impact strength are significantly higher for the blend containing polar-grafted fluoropolymer. This example illustrates that the melt-mixed blend of the invention can have scrap components.

TABLE 2

| Blend Properties for Example 11 | | |
|---|---|---|
| Property | Shred Only | Shred/g-ETFE |
| Ave. particle size (nm) | 1000 | 300 |
| Tensile strength (MPa) | 45.5 | 47.4 |
| Elongation (%) | 122 | 243 |
| Impact strength (J/m)* | 185(PB) | 1154(NB) |

*PB = partial break; NB = no break

What is claimed is:

1. A melt-mixed blend, comprising polyamide as the matrix of the blend and particles of fluoropolymer having polar functionality dispersed therein, said dispersed fluoropolymer having average particle size of no more than 500 nm, said polar functionality being present as part of an ethylenically unsaturated compound grafted to said fluoropolymer.

2. The melt-mixed blend of claim 1, wherein said fluoropolymer is from 3 vol % to 43 vol % of said blend, based on combined volumes of said fluoropolymer and said polyamide.

3. The melt-mixed blend of claim 1, wherein said compound is acid, ester, anhydride, or epoxide.

4. The melt-mixed blend of claim 1, wherein said compound is from 0.1 wt % to 5 wt % of the combined weight of said fluoropolymer and said compound.

5. The melt-mixed blend of claim 1 wherein said fluoropolymer is hydrogen containing.

6. The melt-mixed blend of claim 1 wherein said fluoropolymer is perfluorinated.

* * * * *